United States Patent [19]
Bouillon

[11] 4,059,468
[45] Nov. 22, 1977

[54] METHOD OF MANUFACTURE OF PARTS OF THREE-DIMENSIONAL FABRICS

[75] Inventor: Bernard Bouillon, Nozay, France

[73] Assignee: Commissariat a l'Energie Atomique, Paris, France

[21] Appl. No.: 764,654

[22] Filed: Feb. 1, 1977

[30] Foreign Application Priority Data

Feb. 3, 1976    France ..................... 76.02943

[51] Int. Cl.² .................................... B32B 7/08
[52] U.S. Cl. ................................ 156/93; 112/412; 112/415; 156/82; 156/155; 156/181; 427/227; 427/228; 428/102; 428/367; 428/368; 428/902
[58] Field of Search ............... 427/227, 228; 156/93, 156/82, 155, 180, 173, 181; 112/412, 415; 428/102, 367, 368, 902

[56] References Cited
U.S. PATENT DOCUMENTS

| | | | |
|---|---|---|---|
| 3,367,812 | 2/1968 | Watts | 156/155 |
| 3,607,541 | 9/1971 | Tombrel | 427/228 |
| 3,700,535 | 10/1972 | McCoy et al. | 427/228 |
| 3,779,789 | 12/1973 | Park | 427/227 |
| 3,917,884 | 11/1975 | Jahn | 427/228 |
| 3,971,669 | 7/1976 | Wrzesien et al. | 427/227 |

*Primary Examiner*—Edward G. Whitby
*Attorney, Agent, or Firm*—Cameron, Kerkam, Sutton, Stowell & Stowell

[57] ABSTRACT

A stack formed by layers of bidimensional fabrics or layers of parallel threads extending alternately from one layer to the next in a first direction and a second direction is sewn in parallel lines by means of a thread which extends in a third direction. The layers are stacked on a support of pyrolyzable material, the stack and the support being sewn by means of the thread which extends in the third direction. The assembly thus obtained is subjected to a temperature between 800° C and 1200° C in a stream of gaseous hydrocarbon in order to pyrolyze the material which constitutes the support and to deposit pyrolytic carbon on the threads which form the three-dimensional fabric.

8 Claims, 3 Drawing Figures

METHOD OF MANUFACTURE OF PARTS OF THREE-DIMENSIONAL FABRICS

This invention relates to a method of fabrication of parts of three-dimensional fabrics.

In general, three-dimensional fabrics are constituted by threads, fibers, slivers and so forth, these latter being oriented within the fabric in three different directions which are usually at right angles to each other. By virtue of their high mechanical strength, their excellent heat-insulating power and their good resistance to shocks and to abrasion, these fabrics find many applications, especially when they are formed of threads or of high-performance fibers such as fibers of carbon, graphite or similar materials. Thus, these fabrics are advantageously employed in the manufacture of re-entry units of rockets or missiles as well as in the construction of thermal shields and brake linings.

Various methods for the manufacture of these fabrics are already known. Some methods entail the use of assemblies or machines which serve to separate layers of parallel threads so that the threads which form the second and third directions can be inserted in succession. Other methods consist first in forming a bidirectional structure by successively stacking either layers of flat fabrics with crossed warp and weft threads or layers of parallel threads oriented alternately from one layer to the next in two directions, then in inserting the thread of the third direction by means of a method of sewing in a perpendicular or oblique direction with respect to the plane of the layers.

However, the methods employed up to the present time show that it is not an easy matter to obtain parts of three-dimensional fabrics having very precise shapes and dimensions in addition to a high degree of rigidity such as, for example, parts having the shape of a cone frustum or of a cylindrical ring.

Thus the methods which consist in inserting the thread of the third direction into a structure of bidimensional type by means of a method of sewing entails the need for complex and costly equipment, especially in regard to the construction of supporting mandrels having a shape corresponding to that of the part to be obtained. In fact, such mandrels must be of relatively complex construction in order to make provision in the surface of these latter for sufficiently large gaps to permit the passage of a needle when sewing with the thread of the third direction.

The present invention is directed to a method of manufacture of parts of three-dimensional fabrics for obtaining parts having precise shapes and dimensions as well as good rigidity by means of a method of sewing, starting from a structure of bidimensional type.

To this end, the method in accordance with the invention consists in successively stacking layers of bidimensional fabrics or layers of parallel threads extending alternately from one layer to the next in a first direction and a second direction, then in sewing the stack thus formed in parallel lines by means of a thread which extends in a third direction. The method is distinguished by the fact that said layers are stacked on a support of pyrolyzable material, that the stack of said layers and said support are sewn by means of the thread which extends in the third direction and that the assembly thus obtained is subjected to a temperature within the range of 800° C to 1200° C in the presence of a stream of gaseous hydrocarbon in order to pyrolyze the material which constitutes said support and in order to deposit pyrolytic carbon on the threads which form said three-dimensional fabric.

By virtue of this method, it is no longer necessary to have recourse to supports of openwork construction since the method consists in sewing the assembly which is constituted by the stack of layers and the support. Moreover, the subsequent heat treatment applied to the assembly thus obtained makes it possible not only to ensure removal of the support by pyrolysis but also to rigidify the three-dimensional stucture thus formed by means of a deposit of pyrolytic graphite or carbon on the surface of the threads which form the fabric.

By choosing a support of suitable shape, it is thus possible to manufacture parts having relatively precise shapes or dimensions.

When selecting a suitable pyrolyzable material, it is necessary to take into account the fact that on the one hand the support must have a certain degree of rigidity without thereby offering excessive resistance to the passage of a needle and on the other hand the fact that it must be capable of pyrolyzing within a temperature range which is compatible with the possibilities of pyrolytic graphite or carbon deposits from a gaseous hydrocarbon. Use is advantageously made of paperboard or balsa wood which undergo complete pyrolysis at a temperature below 1000° C. The heat treatment is carried out in the presence of a gaseous hydrocarbon which is selected from the group comprising methane and propane.

In accordance with one characteristic feature of the invention, sewing of the stack of layers and of the support is effected by the thread which extends in the third direction with a lockstitch formed by means of an auxiliary shuttle thread. The tension of the two threads is adjusted so as to ensure that the knot between the two threads is formed within the thickness of the support. The auxiliary shuttle thread is advantageously formed of pyrolyzable material such as cotton or rayon, for example.

In a preferred alternative embodiment of the invention, the support comprises a graphite core surrounded by pyrolyzable material and said graphite core is extracted after the assembly has been subjected to the temperature which is necessary for pyrolyzing said material. The result thereby achieved is to give better ridigity to the support on which the layers are to be stacked in order to prevent any deformations which would be liable to arise at the time of sewing of the stack of layers and of the support.

A clearer understanding of the invention will be gained from the following description which is given without any limitation being implied, reference being made to the accompanying drawings in which.

The method in accordance with the invention can be applied to the construction of parts having different shapes and any desired profile such as, for example, parts of cylindrical shape, of frusto-conical shape, of parallelepipedal shape or parts in the form of plates or discs.

Figure 1:
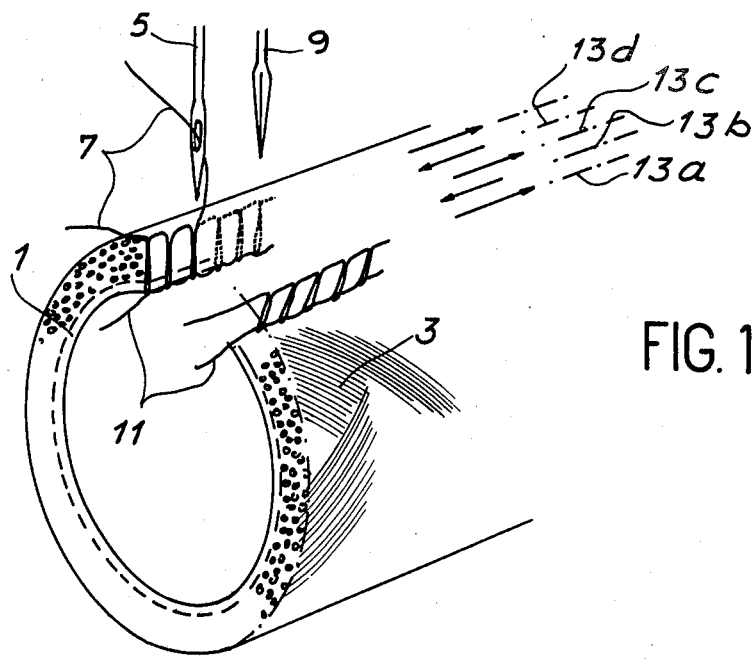
FIG. 1 illustrates the first step of the method, namely the sewing of the stack of layers and of the support.

There is given by way of example in the following description one mode of execution of the method which relates to the construction of parts having the shape of a cylindrical ring. Referring to FIG. 1, there is shown the support 1 of balsa wood of cylindrical shape which corresponds to the dimensions of the part to be constructed. A number of superposed layers 3 of carbon fabrics or carbon threads which may or may not be twisted have been placed beforehand on the external surface of said support 1 so as to constitute a bidimensional structure of desired thickness around the cylindrical support 1. The cylindrical support 1 covered with the stack of layers 3 is placed on a sewing machine (not shown in the drawings) which is suitably adapted to this application. Said sewing machine has a sewing head fitted with a needle 5 through which is passed the carbon thread 7, said thread being intended to be inserted in the third direction. As an advantageous feature, the sewing head is also fitted with another needle 9 which serves to pierce the entire stack prior to insertion of the needle 5 which carries the carbon thread 7 in order to facilitate the introduction of said needle 5 through the stack of layers 3 and the support 1. The sewing machine is equipped with a shuttle (not shown) on which is wound a fairly strong auxiliary thread 11 such as a cotton or rayon thread and the cylindrical support 1 is mounted on the sewing machine in such a manner as to ensure that the needle 5 is capable of passing through its surface at right angles to the layers 3 and that the shuttle is located on the other side of this surface, namely within the interior of the cylindrical support 1. Thus the sewing machine is capable of operating so as to form a lockstitch by means of the stitching thread 7 and the shuttle thread 11.

After the sewing machine has been started up, a first sewing line 13a is formed along a generating-line of the cylindrical support 1. The tension of the stitching thread 7 and the tension of the shuttle thread 11 are adjusted beforehand so as to ensure that the knot between the two threads is located within the thickness of the cylindrical support 1 as close as possible to the internal surface of said support.

There are then formed other continuous sewing lines such as 13b, 13c, 13d and so forth along closely spaced generating-lines of the cylindrical support 1 so as to insert into the thickness of the bidirectional structure carbon threads which are at right angles to those of the layers 3 stacked on the surface of the cylindrical support 1. Cohesion of the complete assembly is thus ensured by means of the sewing thread 7 around the periphery of the cylindrical support 1.

Figure 2:
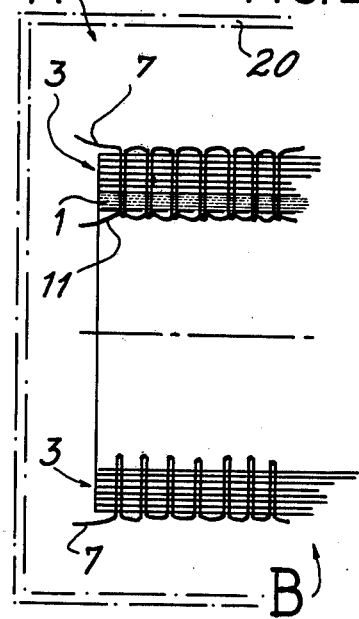
FIG. 2 illustrates the second step of the method, namely the heat treatment of the assembly which is thus obtained.

Referring now to FIG. 2, the portion A illustrates in vertical cross-section the structure of the assembly which is obtained after the sewing operation and shows the stack of layers 3 which are sewn together by means of the carbon thread 7 which is passed through said stack from one side to the other in a direction substantially at right angles to the plane of the layers 3 in the form of a continuous thread in tension, the visible portions of which are located on each side of the end faces of the stack of layers 3. The shuttle thread 11 which is employed for the purpose of forming the lockstitch in turn forms through the cylindrical support 1 a continuous thread disposed in a curve of sinusoidal shape and small amplitude, one of the summits of which is located substantially on the internal surface of the cylindrical support 1 whilst the other summit is located within the interior of said support and as close as possible to its internal surface.

The assembly thus obtained is then placed in a furnace 20 which is illustrated very diagrammatically. The furnace 20 is heated to a temperature of 1000° C and a gaseous hydrocarbon such as methane is introduced continuously into the furnace enclosure.

Under the action of this high temperature, the balsa wood which constitutes the support disappears as a result of pyrolysis and decomposes into volatile products whilst the methane is dissociated and produces carbon or pyrolytic graphite which is deposited on the solid surfaces within the furnace 20 and especially on the threads of the three-dimensional structure which is accordingly endowed with rigidity. The shuttle thread is also pyrolyzed under the action of said temperature and there is obtained at the end of the operation a part having the shape of a cylindrical ring as shown in the portion B of said figure, comprising the stack of layers 3 through which the carbon thread 7 is passed. Said part has an internal diameter which is substantially equal to the external diameter of the cylindrical support 1 and has a thickness substantially equal to that of the stack of layers 3 which have previously been placed on said support.

Figure 3:
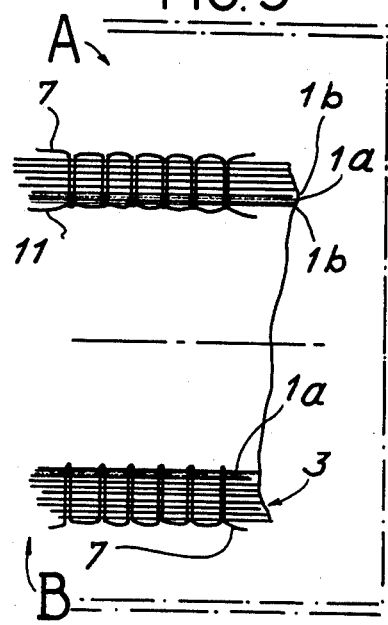
FIG. 3 illustrates the second step of the method in accordance with an alternative embodiment of the invention which relates to the support structure.

In accordance with a preferred alternative embodiment of the invention shown in FIG. 3, the cylindrical support 1 illustrated in the portion A of this figure comprises a graphite core 1a surrounded by pyrolyzable material 1b such as balsa wood.

In this alternative embodiment, the operation which consists in sewing the superposed layers on the cylindrical support 1 is carried out in exactly the same manner and the assembly thus obtained is then placed within the furnace 20 which is heated to a temperature of 1000° C in the presence of a stream of methane.

In the same manner, the pyrolyzable material 1b disappears and dissociates into volatile products. At the end of the operation, there is obtained a well rigidified part of three-dimensional fabric as shown in the portion B and it is only necessary at this point to re-machine the internal surface of said part in order to remove the non-pyrolyzed graphite core.

Although the mode of execution of the method described in this example applies to the production of parts made of carbon fabrics, it is readily apparent that the fabrics can be made from different threads provided that they are not liable to suffer degradation under the action of the temperature required for pyrolysis of the material which constitutes the support.

Furthermore, the threads which are intended to form the three-dimensional fabric can be either of the same type or of a different type. It is possible in particular to employ graphite threads, glass threads and silica threads which may or may not be in the form of twisted yarn.

What we claim is:

1. A method of manufacture of parts of three-dimensional fabrics of the type which consists in successively stacking layers of bidimensional fabrics or layers of parallel threads extending alternately from one layer to the next in a first direction and in a second direction, and sewing the stack thus formed in parallel lines by means of a thread which extends in a third direction, wherein said layers are stacked on a support of pyrolyzable material, wherein the stack of said layers and said support are sewn by means of the thread which extends in the third direction and wherein the assembly thus obtained is subjected to a temperature within the range of 800° C to 1200° C in the presence of a stream of gaseous hydrocarbon in order to pyrolyze the material which constitutes said support and in order to deposit pyrolytic graphite or carbon on the threads which form said three-dimensional fabric.

2. A method according to claim 1, wherein the pyrolyzable material is selected from the group comprising paperboard and balsa wood.

3. A method according to claim 1, wherein sewing of the stack of layers and of the support is effected by the thread which extends in the third direction with a lockstitch formed by means of an auxiliary shuttle thread and wherein the tension of the two threads is adjusted so as to ensure that the knot between the two threads is formed within the thickness of said support.

4. A method according to claim 1, wherein the gaseous hydrocarbon is selected from the group comprising methane and propane.

5. A method according to claim 1, wherein the support comprises a graphite core surrounded by pyrolyzable material and wherein said graphite core is extracted after the assembly has been subjected to a sufficiently high temperature to pyrolyze said material.

6. A method accordng to claim 1, wherein the threads of the fabric are selected from the group consisting of carbon threads, graphite threads, glass threads and silica threads.

7. A method according to claim 6, wherein the threads of the fabric are twisted threads.

8. A method according to claim 3, wherein the auxiliary shuttle thread is a thread of pyrolyzable material selected from the group consisting of rayon and cotton.

* * * * *